United States Patent
Guo et al.

(10) Patent No.: US 12,443,607 B1
(45) Date of Patent: Oct. 14, 2025

(54) LLM-BASED RECOMMENDER SYSTEM FOR DATA CATALOG

(71) Applicant: SAP SE, Walldorf (DE)

(72) Inventors: Jing Guo, Xi'an (CN); Ming Yan, Xi'an (CN); Lianjie Qin, Xi'an (CN); Jingtao Li, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/804,648

(22) Filed: Aug. 14, 2024

(51) Int. Cl.
*G06F 16/2457* (2019.01)
*G06F 16/248* (2019.01)

(52) U.S. Cl.
CPC ...... *G06F 16/24575* (2019.01); *G06F 16/248* (2019.01)

(58) Field of Classification Search
CPC ............... G06F 16/24575; G06F 16/248
See application file for complete search history.

(56) References Cited

U.S. PATENT DOCUMENTS

| | | | | |
|---|---|---|---|---|
| 7,305,436 B2* | 12/2007 | Willis | ............... | G06F 16/954 709/219 |
| 7,370,276 B2* | 5/2008 | Willis | ............... | G06F 16/954 715/744 |
| 7,885,902 B1* | 2/2011 | Shoemaker | ............ | G06Q 50/01 705/1.1 |
| 12,135,740 B1* | 11/2024 | Yu | ............... | G06F 16/3329 |
| 12,306,828 B1* | 5/2025 | Chakraborty | ..... | G06F 16/24522 |
| 2022/0374329 A1* | 11/2022 | Savir | ............... | G06F 11/3457 |
| 2024/0265193 A1* | 8/2024 | Schafer | ............... | G06F 40/169 |
| 2024/0296287 A1* | 9/2024 | Jia | ............... | G06F 40/242 |
| 2024/0330411 A1* | 10/2024 | Wu | ............... | G06N 3/045 |
| 2024/0372876 A1* | 11/2024 | Shachar | ............... | H04L 41/16 |
| 2024/0403373 A1* | 12/2024 | Chao | ............... | G06F 16/9538 |
| 2025/0045336 A1* | 2/2025 | Gonsalves | ............ | G06F 16/3329 |
| 2025/0173514 A1* | 5/2025 | Greene | ............... | G06F 40/40 |

\* cited by examiner

*Primary Examiner* — Jorge A Casanova
(74) *Attorney, Agent, or Firm* — SCHWEGMAN LUNDBERG & WOESSNER, P.A.

(57) ABSTRACT

LLMs use probabilistic methods to create coherent responses, sometimes going beyond the training data. This can result in "LLM hallucination." Asset metadata is used in constructing prompts for the LLM, enhancing the LLM's understanding of available assets. Including a limited set of candidate assets in an LLM prompt template as part of a chain-of-thought prompt can solve the hallucination issue. Multiple rounds of interaction with the LLM may be used, allowing for more dynamic and responsive user engagement. The LLM-based recommender system for data catalogs may comprise asset metadata, user data, and a recommender model. The output of the LLM-based recommender system is a recommended asset list. The prompts may explicitly instruct the LLM to limit elements of the list to the candidate set of assets. The LLM's advanced context understanding and reasoning abilities enable it to deliver accurate and interpretable personalized recommendations.

20 Claims, 11 Drawing Sheets

LLM-BASED RECOMMENDER SYSTEM FOR DATA CATALOG

TECHNICAL FIELD

The subject matter disclosed herein generally relates to data catalog services for discovery and management of data assets, and more specifically, to a hybrid recommender system that leverages large language models (LLMs) and asset metadata to improve data catalog services on cloud platforms.

BACKGROUND

Data Catalog services on cloud platforms are designed to streamline the discovery and management of organizational data assets. The effectiveness of traditional recommender systems is limited by their poor interpretability and the challenges in making accurate personalized recommendations, particularly in cold start scenarios lacking historical behavior data.

LLMs use probabilistic methods to create coherent responses, sometimes going beyond the training data. This can result in "LLM hallucination," producing misleading or incorrect information, which can be useful for creative tasks like storytelling but problematic in accuracy-critical areas like research or specific domain recommendations. In recommender systems, LLM hallucinations can lead to suggestions of irrelevant data assets or promote non-existent or misleading ones, diverging from user preferences and past behavior.

DETAILED DESCRIPTION

Figure 1:
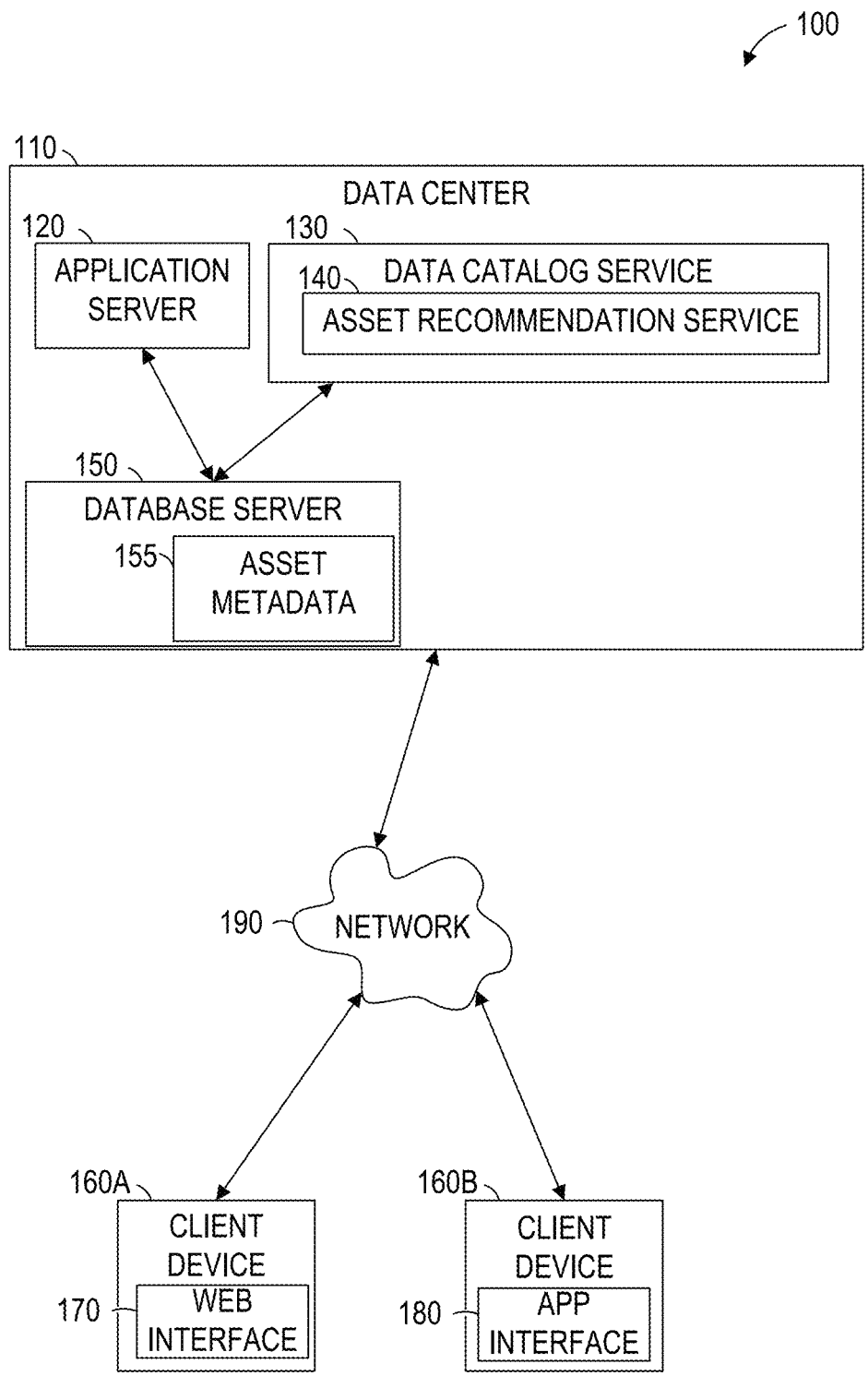
FIG. 1 shows a network diagram illustrating an example network environment suitable for providing an LLM-based recommender system for a data catalog.

Example methods and systems are directed to improving asset discovery in a data catalog using an LLM-based recommender system. In some example embodiments, the data catalog recommender system emphasizes interpretability, letting users understand why specific catalogs are recommended. Without an interpretable model, users may not trust the recommendations. The LLM-based recommender system supports natural language interactions and provides clear explanations, allowing for iterative refinement through user conversations, thereby offering an engaging and transparent recommendation experience.

The "cold start" problem in recommender systems arises when there is limited data on new users or items, hindering the ability of traditional algorithms, which rely on historical interactions, to make relevant recommendations. As disclosed herein, a hybrid recommender system that leverages LLMs and asset metadata effectively addresses the "cold start" issue in data catalog services on cloud platforms. LLMs interact with users in natural language to gather preferences and refine recommendations, building personalized profiles. By analyzing textual data like metadata and user profiles, the system offers relevant suggestions even with limited user interaction data, improving on existing systems.

As discussed herein, an LLM is used in a ranking layer to rank assets. The LLM's advanced context understanding and reasoning abilities enable it to deliver accurate and interpretable personalized recommendations.

An LLM-based system excels in 'cold start' situations compared to traditional models. The LLM-based system utilizes natural language interactions, LLMs' extensive knowledge, and user profiles to recommend assets effectively for new users and assets without the need for training datasets, streamlining the process, and saving time.

Asset metadata is used in constructing prompts for the LLM, enhancing the LLM's understanding of available assets. This leads to more accurate and interpretable personalized recommendations. Including a limited set of candidate assets in an LLM prompt template as part of a chain-of-thought prompt can solve the hallucination issue. Chain-of-thought prompting instructs the LLM to perform multiple mental steps before producing an output. The quality of recommendation results may also be improved by utilizing the LLM's capability for multiple rounds of interaction, allowing for more dynamic and responsive user engagement.

The LLM-based recommender system for a data catalog may comprise asset metadata, user data, and a recommender model. The output of the LLM-based recommender system is a recommended asset list. The asset metadata includes information about the data assets, such as asset identifier, asset name, description, author, creation date, or any suitable combination thereof. The user data comprises information about the user requesting the recommendation, such as username, role, and historical behavior.

The recommender model includes one or more of a recall layer, a metadata layer, and a ranking layer. The recall layer filters a relevant candidate asset set for each user request using algorithms and rules like inverted indexing. The recall layer may utilize multiple recall algorithms, such as hot recall, collaborative filtering, matrix factorization and KNN (K nearest neighbors) to gather subsets of assets, forming a comprehensive candidate set. The candidate set sent to the metadata layer determines the LLM's selection range in the ranking layer's prompt. This confines the LLM's output to this set, effectively tackling the LLM's hallucination issue.

The metadata layer gathers related metadata based on the candidate set of assets generated by the recall layer. The gathered metadata is provided, along with the candidate set of assets, to the ranking layer.

The ranking layer generates prompts using the candidate set of assets and metadata from the metadata layer. The prompts may be further based on user profile data, user-asset history data, or both. The generated prompts are provided to the LLM to generate a list of recommended assets. The prompts may explicitly instruct the LLM to limit elements of the list to the candidate set of assets.

By using the systems and methods herein, a computing system serving the purpose of a data asset recommendation system is improved. Typical natural language searches using LLMs have a significant risk of hallucination, which is addressed by the disclosed system, improving the value of search results. By contrast with recommendation systems that do not use LLMs, the ability to handle natural-language queries is substantially improved.

FIG. 1 shows a network diagram illustrating an example network environment 100 suitable for providing an LLM-based recommender system for a data catalog. The network environment 100 includes a data center 110, client devices 160A and 160B, and a network 190. The data center 110 comprises an application server 120 in communication with a database server 150 that stores asset metadata 155. The data center 110 implements a data catalog service 130 that comprises an asset recommendation service 140. The letter suffixes of reference numbers may be omitted when doing so does not raise ambiguity. For example, the client devices 160A-160B may be referred to collectively as "client devices 160." Similarly, when the specific one of the client devices 160A-160B is not of particular import, "client device 160" may be referenced.

The data catalog service 130 enables users to access data assets from the database server 150. The asset recommendation service 140 may be accessed by users of the client devices 160A-160B to provide recommendations for data assets that are stored at the database server 150. The asset metadata 155 describes the available data assets. The data assets may be used by the application server 120.

An application executing on the application server 120 may access data from the database server 150. The application server 120 may provide a data catalog UI that allows users to discover, enrich, and manage data assets from different sources. The application server 120 may also provide a data warehouse cloud UI that allows users to build a customized data view, analytical model, and other data models. Other functions that may be performed by the application server 120 include a space runtime service, a data service, and a deployment service. The space runtime service allows users to manage their profiles, check their histories, and manage roles. The space runtime service may provide user information to the asset recommendation server. The data service supports the data warehouse cloud UI. The deployment service allows users to deploy selected data assets and share them with other users.

The data catalog UI may be accessed by a user of the client devices 160A or 160B using a web interface 170 or an application interface 180. For example, the client device 160B may be a mobile device, such as a smart phone, and the data catalog UI may be presented using a dedicated application running on the mobile device. As another example, the client device 160A may be a desktop computer and the data catalog UI may be presented in a web browser running on the desktop computer.

The asset recommendation service 140 may provide the backend for the data catalog service 130, including features such as enrichment, search, and metadata management. Enrichment of data refers to adding related information. For example, a user table that contains a username and email address can be enriched by adding descriptions, tags, and other information gathered about the user. As another example, a business unit table that contains some information about business units can be enriched by adding KPIs for the business units.

The search features may allow a user to search for data assets in a data catalog by keyword, creation date, and the like. In response, the asset recommendation service 140 presents matching data assets in a user interface to the user.

The asset recommendation service 140 may also provide a data catalog recommendation service that recommends assets based on asset metadata and using an LLM. The asset metadata 155 may be accessed via a repository service that provides create, read, update, and delete (CRUD) access to data records, allows for repository search, lineage and impact, cloud import/export, and other features.

The application server 120, the database server 150, and the client devices 160A-160B may each be implemented in a computer system, in whole or in part, as described below with respect to FIG. 11. Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the database server 150, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Though FIG. 1 shows only one or two of each element (e.g., one asset recommendation service 140, one application server 120, two client devices 160A and 160B, and the like), any number of each element is contemplated. For example, the application server 120 may be one of dozens or hundreds of active and standby servers and provide services to millions of client devices. Likewise, the asset recommendation service 140 may be accessed by dozens, hundreds, or thousands of users with client devices 160, be used by many application servers 120, and so on.

Figure 2:
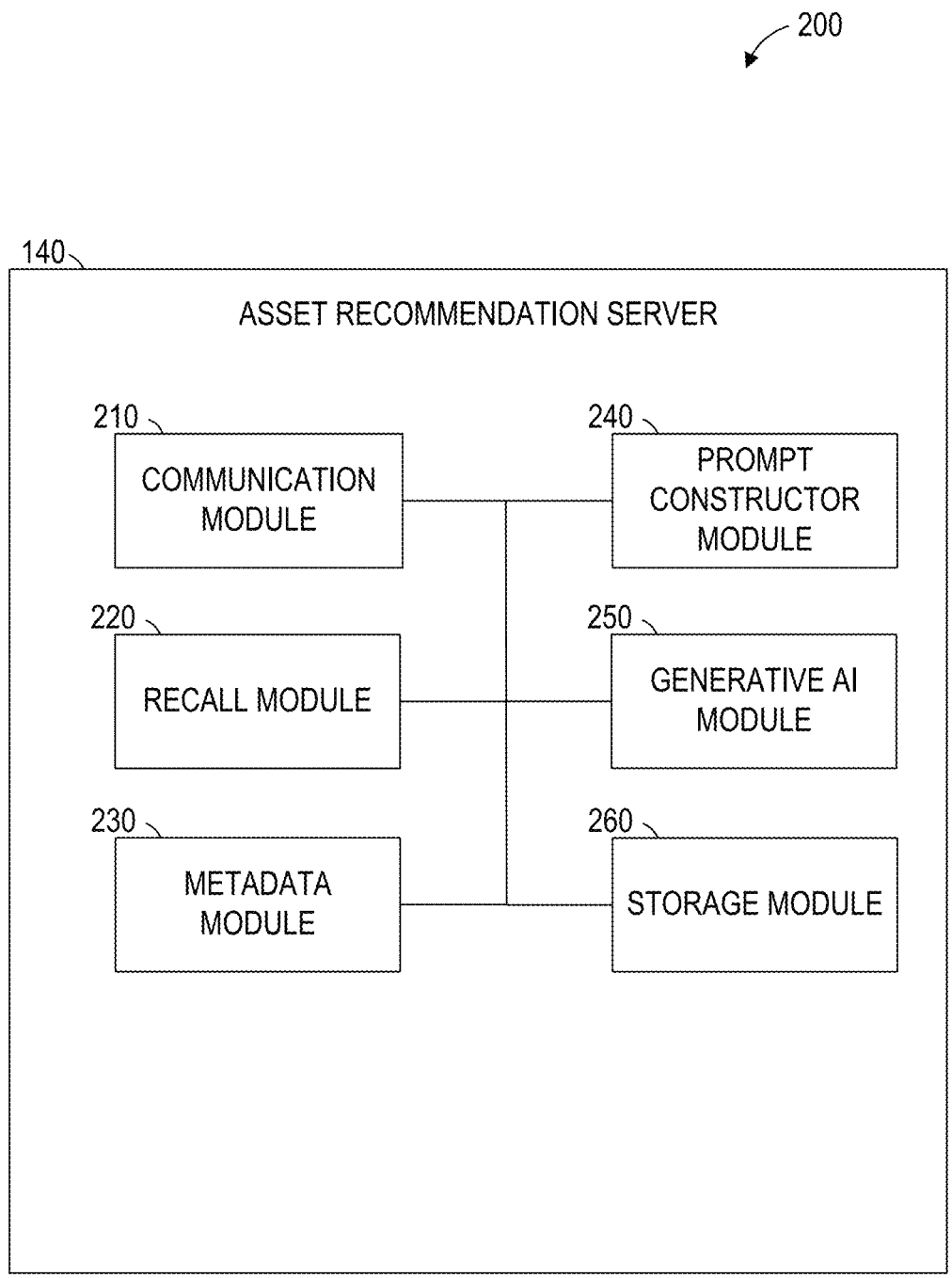
FIG. 2 shows a block diagram of an asset recommendation server, suitable for providing an LLM-based recommender system for a data catalog.

FIG. 2 shows a block diagram 200 of the asset recommendation service 140, suitable for providing an LLM-based recommender system for a data catalog. The asset recommendation service 140 is shown as including a communication module 210, a recall module 220, a metadata module 230, a prompt constructor module 240, a generative AI module 250, and a storage module 260, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the asset recommendation service 140 and transmits data from the asset recommendation service 140. For example, the communication module 210 may receive, from the client device 160A, a request to for a recommendation of one or more data assets. The request may include or reference a topic, a current data asset, a user profile, or any suitable combination thereof. In response, the communication module 210 provides the user input to the generative AI module 250. The communication module 210 may also send recommendations to the client devices 160 or receive asset metadata from the asset metadata 155.

The recall module 220 filters relevant candidate assets for a user. The filtering may be performed using one or more algorithms, such as inverted indexing, hot recall, collaborative filtering, matrix factorization, and KNN. The candidate set may be provided to the metadata module 230.

The metadata module 230 accesses metadata related to the candidate set received from the recall module. For example, the candidate set generated by the recall module 220 may comprise identifiers for each candidate. The metadata module 230 may supplement the candidate set with metadata accessed, using the identifiers, from the asset metadata 155.

The prompt constructor module 240 constructs a prompt for an LLM based on the supplemented candidate set from the metadata module 230. The prompt may include metadata generated by the metadata module 230, information provided by a user requesting the recommended asset list, information about the user requesting the recommended asset list, or any suitable combination thereof.

The generative AI module 250 includes an LLM that generates a recommended asset list in response to a prompt generated by the prompt constructor module 240. The LLM may be trained by providing a training set of prompts and recommended asset lists. Alternatively, using well-constructed prompts, a general-purpose LLM may provide high quality results without specialized training. The recommended asset list may be provided to the client device 160 or the application server 120.

Data, metadata, documents, instructions, or any suitable combination thereof may be stored and accessed by the storage module 260. For example, local storage of the asset recommendation service 140, such as a hard drive, may be used. As another example, network storage may be accessed by the storage module 260 via the network 190.

Figure 3:
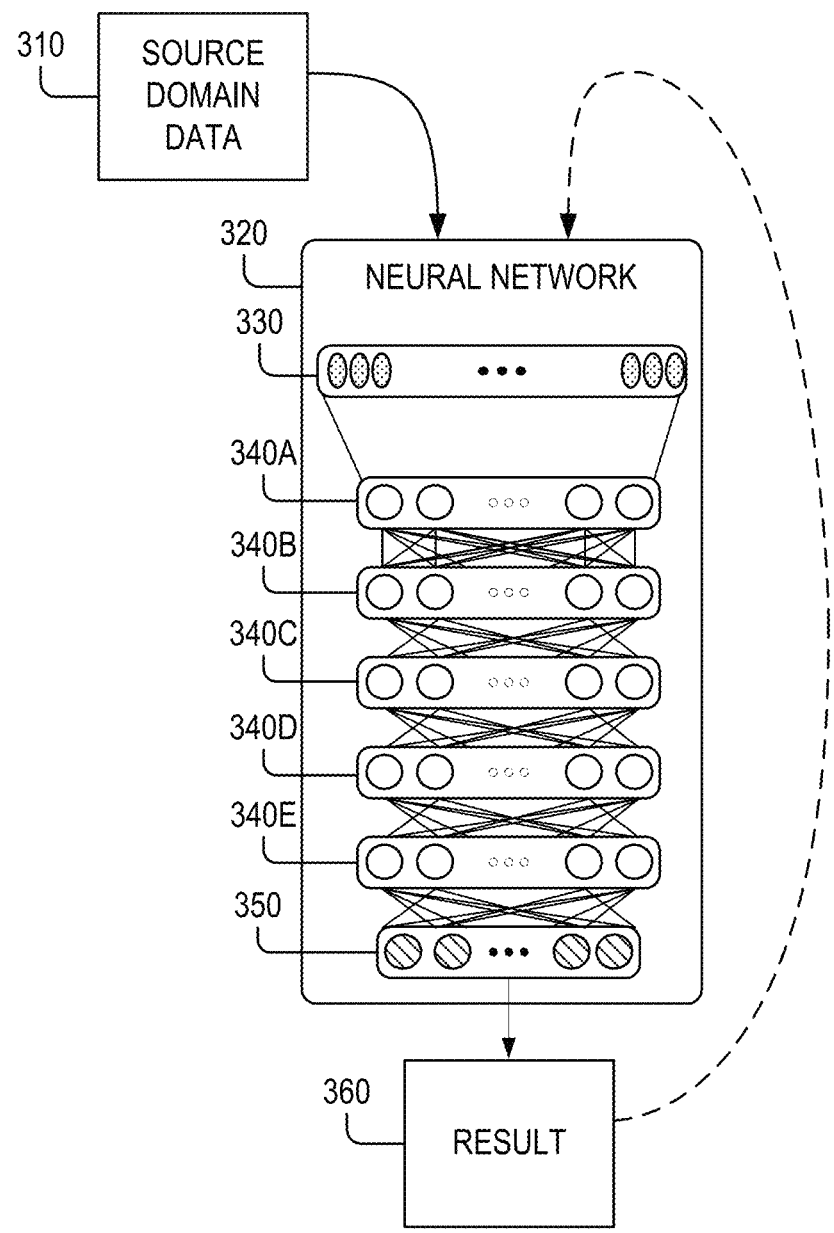
FIG. 3 is a block diagram of a neural network, suitable for use as a machine learning model for generating recommendations, according to some example embodiments.

FIG. 3 is a block diagram of a neural network 320, suitable for use as a machine learning model for generating recommendations, according to some example embodiments. The neural network 320 takes source domain data 310 as input and processes the source domain data 310 using an input layer 330; intermediate, hidden layers 340A, 340B, 340C, 340D, and 340E; and output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from the source domain data 310. The output of the output layer 350 is the result 360. The intermediate layers 340A-340E are referred to as "hidden" because they do not interact directly with either the input or the output and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. In some example embodiments, the number of epochs is 10, 100, 500, or 1000. Within an epoch, one or more batches of the training dataset are used to train the model. Thus, the batch size ranges between one and the size of the training dataset, and the number of epochs is any positive integer value. The model parameters are updated after each batch (e.g., using gradient descent).

For self-supervised learning, the training dataset comprises self-labeled input examples. For example, a set of color images could be automatically converted to black-and-white images. Each color image may be used as a "label" for the corresponding black-and-white image and used to train a model that colorizes black-and-white images. This process is self-supervised because no additional information, outside of the original images, is used to generate the training dataset. Similarly, when text is provided by a user, one word in a sentence can be masked and the network trained to predict the masked word based on the remaining words.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model, satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusters is used to select a model that produces the clearest bounds for its clusters of data.

The neural network 320 may be a deep learning neural network, a deep convolutional neural network (CNN), a recurrent neural network, a transformer neural network, or another type of neural network. A neuron is an architectural element used in data processing and artificial intelligence, particularly machine learning. A neuron implements a transfer function by which a number of inputs are used to generate an output. In some example embodiments, the inputs are weighted and summed, with the result compared to a threshold to determine if the neuron should generate an output signal (e.g., a 1) or not (e.g., a 0 output). The inputs of the component neurons are modified through the training of a neural network. One of skill in the art will appreciate that neurons and neural networks may be constructed programmatically (e.g., via software instructions) or via specialized hardware linking each neuron to form the neural network.

An example type of layer in the neural network 320 is a Long Short Term Memory (LSTM) layer. An LSTM layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input. Thus, the coefficients assign significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight updates. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value, which roughly represents its contribution to the original output. Backpropagation can use these error values to calculate the gradient of the cost function with respect to the weights in the neural network. The calculated gradient is fed to the selected optimization method to update the weights to attempt to minimize the cost function.

In some example embodiments, the structure of each layer is predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, DNNs, genetic or evolutionary algorithms, and the like. With the help of natural language processing (NLP) and advanced data pre-processing, a machine learning model (e.g., the neural network 320) can be trained on historical (existing) data (for instance, resource usage data) from the system to predict future data.

The transformer architecture processes an entire input at once rather than sequentially. For example, a recurrent neural network (RNN) processes words or sentences sequentially, with the output of the RNN treated as an input for each input after the first (thus the use of the word "recurrent" in the name). As a result, relationships between elements that are far apart in the input are difficult to detect. The transformer architecture receives a larger input and learns the interrelationships between the elements and the output using an attention mechanism. Since all elements are processed together, distance between the elements of the input does not affect the learning process. The output may still be generated sequentially, with the previous result (e.g., word for an LLM, pixel for an image-generating artificial intelligence, and the like) being provided as an input for determination of the next result.

Figure 4:
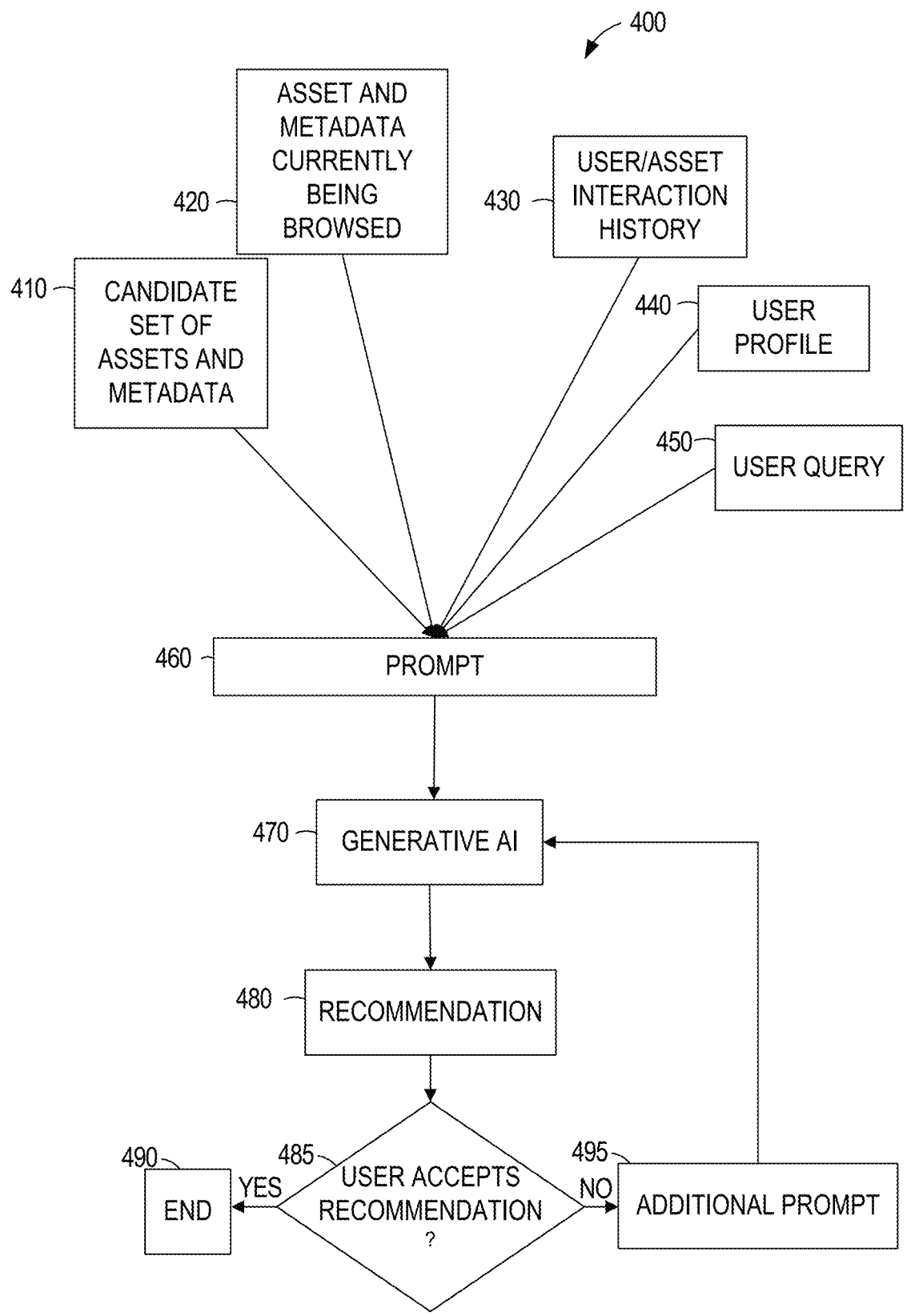
FIG. 4 illustrates a data flow for an LLM-based recommender system for data catalogs, according to some example embodiments.

FIG. 4 illustrates a data flow 400 for an LLM-based recommender system for data catalogs, according to some example embodiments. Data is used to generate a prompt 460. The data used includes a candidate set of assets and metadata 410, an asset currently being browed and its metadata 420, a user/asset interaction history 430, a user profile 440, a user query 450, or any suitable combination thereof. The prompt 460 is provided to a generative AI 470. In response to the prompt 460, the generative AI 470 generates a recommendation 480.

A candidate set of assets is derived from the recall module 220. Metadata for the candidate set of assets is derived from the metadata module 230. Together, the candidate set of assets and metadata 410 serves as a selection pool for the generative AI 470. The generative AI 470 chooses and arranges assets from the selection pool. Using the candidate set of assets and metadata 410 addresses the hallucination issue commonly associated with LLMs. Additionally, the metadata aids the LLM in more accurately comprehending the assets within the candidate set of assets.

The asset currently being browsed and its metadata 420 may aid the generative AI 470 in providing accurate recommendations. For example, when a user selects an asset and seeks similar or related assets, the selected asset and its metadata can be inputted into the generative AI 470. As a result, the generative AI 470 is better able to understand and cater to the user's specific intentions.

A user's past interaction with various assets may be provided in the user/asset interaction history 430. The user's past interactions may include clicks, access history, ratings, or any suitable combination thereof. The generative AI 470 may use this information to understand the user's unique preferences and specific needs.

The user profile 440 includes information related to the user, such as gender, location, age, role, and areas of interest. The user profile 440 may enable the generative AI 470 to discern the user's distinct characteristics and preferences. The user profile 440 may be of particular usefulness in cold start scenarios.

The user may provide the user query 450 via a user interface. The user query 450 includes the user's specific request for information or recommendations. For example, the user query 450 may include particular details about an asset, identify a genre of interest, or both.

A prompt constructor (e.g., the prompt constructor module 240 of FIG. 2) uses some or all of the data to generate the prompt 460. The generated prompt is provided to the generative AI 470, which generates the recommendation 480 (e.g., a ranked asset list). If the user accepts the recommendation (operation 485), then the data flow 400 is complete (operation 490). Otherwise, the user provides an additional prompt 495 to the generative AI 470. Thus, the generative AI 470 can repeatedly attempt to satisfy the user in an iterative process.

The prompt constructor defines a role for an LLM in the prompt. This allows the LLM to analyze the task and context from the perspective of the role. The prompt also defines a task for the LLM to perform, context to aid the LLM in performing the task, and an output format in which the LLM should provide its results. An example task would be of the form: "Your task involves analyzing the asset I am currently viewing, its metadata, your recently viewed assets and their metadata, assets of interest, my role, and personal preferences. The process is as follows: First, determine my interest intent. Next, identify assets commonly used with the currently browsed asset. Finally, from the assets of interest, select and rank the top 3 based on my interest intent, assign a recommendation score, and recommend them to me."

The context provided in the prompt may include information from the user profile 440, the user/asset interaction history 430, the query 450, the asset currently being browed and its metadata 420, or any suitable combination thereof. The output format may be JavaScript Object Notation (JSON).

Figure 5:
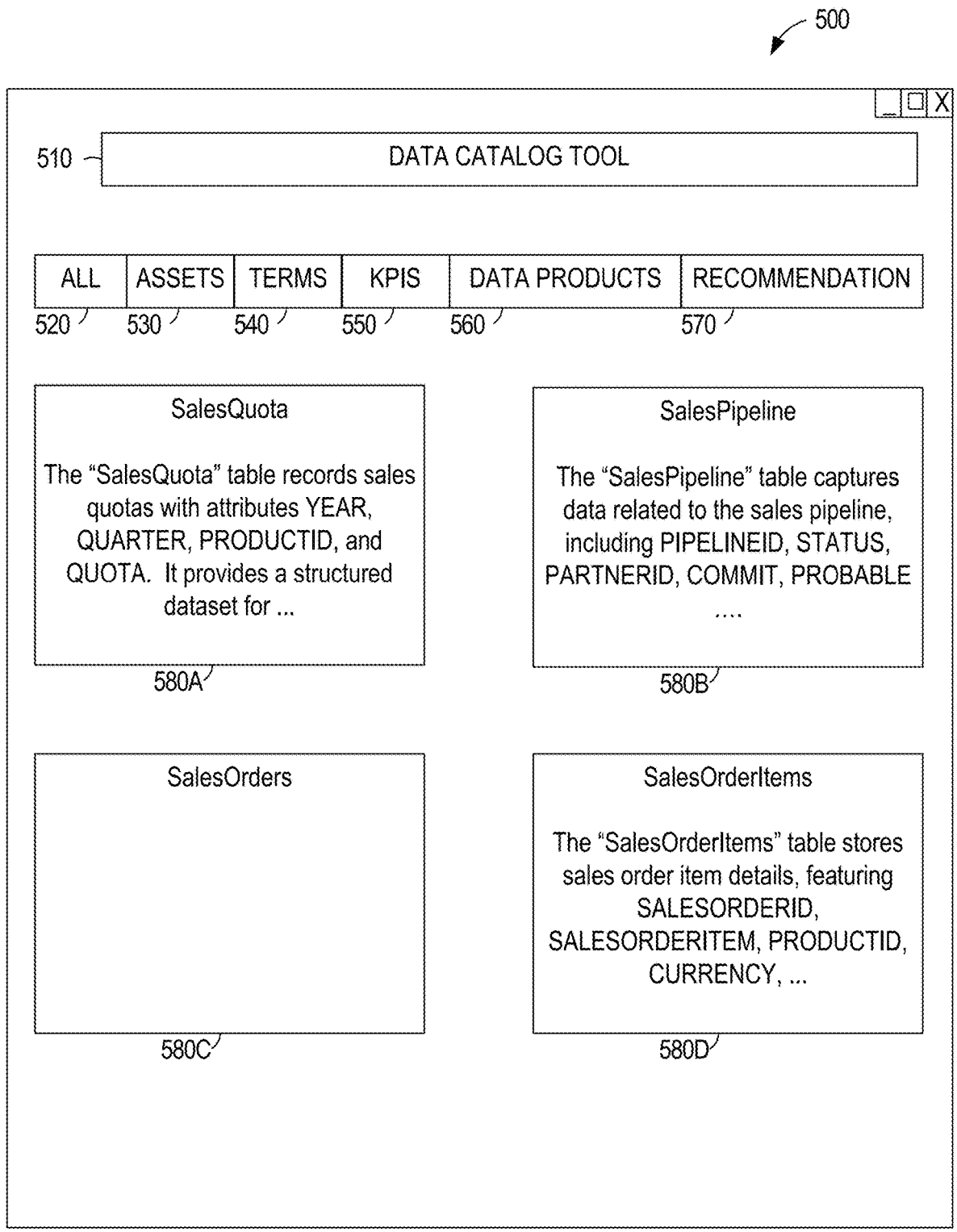
FIG. 5 shows an illustration of a user interface suitable for a data asset recommendation tool, according to some example embodiments.

FIG. 5 shows an illustration of a user interface 500 suitable for a data asset recommendation tool, according to some example embodiments. The user interface 500 includes a title 510, tabs 520, 530, 540, 550, and 560, and results 580A, 580B, 580C, and 580D. The user interface 500 may be presented on a display of one of the client devices 160, for use by a user seeking asset recommendations.

The title 510 indicates that the user interface 500 is for a data catalog tool. The tabs 520-570 are operable by the user to cause display of data assets from a data catalog according to different options. For example, the tab 520 may cause display of all available data assets. The tab 530-560 may cause display of various subsets of available data assets. The tab 570 may cause display of recommended data assets. The user interface 500 may be displayed after selection of the tab 570.

The results 580A-580D include a name of a data asset and, optionally, a description of the data asset. Clicking on one of the results 580A-580D may cause selection or display of the corresponding data asset.

With reference to FIG. 4, a current data asset may be used as part of the asset and metadata currently being browsed 420. A user-provided query may be used as the user query 450, or a portion thereof. Data for the user, such as a role and interests, may be used as a part of the user profile 440.

In an example, the candidate set of assets, generated by the recall module 220 of FIG. 2, is ["SalesOrderItems", "SalesQuota", "CountryRegion"]. The metadata module 230 uses the candidate set of assets from the recall module 220 to gather relevant metadata from a data catalog or asset metadata. The metadata module 230 selects key metadata elements, such as asset names and columns, to create a refined candidate set with simplified metadata for further processing. An example resulting candidate set of assets and metadata 410 is:

[
{"SalesOrderItems": {"name": "SalesOrderItems", "elements": ["SALESORDERID", "SALEDORDERITEM", "PRODUCTID", "NOTEID", "CURRENCY", "GROSSAMOUNT", "NETAMOUNT", . . . ]}},
{"SalesQuota": {"name": "SalesQuota", "elements": ["YEAR", "QUARTER", "PRODUCTID", "QUOTA"]}}, {"CountryRegion": {"name": "CountryRegion", "elements": ["COUNTRYCODE", "REGIONCODE"]}}
]

As described with respect to FIG. 4, the prompt constructor module 240 uses inputs such as user role, areas of interest, metadata of the asset being browsed, previously viewed assets, and other relevant information to construct a prompt. This approach tailors the LLM's recommendations to the specific needs and interests of the user, ensuring more precise and relevant results. Below is an example prompt:

Role: You are a seasoned data recommendation expert.
User role: I am a data analyst of sales.
User interest: My recent focus has been on assets related to sales.
User query: I recently conducted searches using keywords like "sales" and "orders".
Browsing asset and metadata: The asset I am currently browsing and its metadata are: {"SalesOrders": {"name": "SalesOrders", "elements": ["SALESORDERID", "CREATEDBY", "CREATEDAT", "CHANGEDBY", "CHANGEDAT", "FISCVARIANT", "FISCALYEARPERIOD", "NOTEID", "PARTNERID", "SALESORG", "CURRENCY", "GROSSAMOUNT", "NETAMOUNT", "TAXAMOUNT", "LIFECYCLESTATUS", "BILLINGSTATUS", "DELIVERYSTATUS"]}}.
Viewed assets and metadata: My recently viewed assets and their metadata are: [{"SalesPipeline": {"name": "SalesPipeline", "elements": ["PIPELINEID", "STATUS", "PARTNERID", "COMMIT", "PROBABLE", "UPSIDE", "SALESORDER", "EXPECTEDCLOSINGDATE", "PRODUCTID", "CREATEDBY", "CREATEDAT"]}}]
Assets of interest and metadata: The assets of interest and their metadata are: [{"SalesOrderItems": {"name": "SalesOrderItems", "elements": ["SALESORDERID", "SALESORDERITEM", "PRODUCTID", "NOTEID", "CURRENCY", "GROSSAMOUNT", "NETAMOUNT", "TAXAMOUNT", "IETMATPSTATUS", "OPITEMPOS", "QUANTITY", "QUANTITYUNIT", "EXPECTEDDELIVERYDATE"]}}, {"SalesQuota": {"name": "SalesQuota", "elements": ["YEAR", "QUARTER", "PRODUCTID", "QUOTA"]}}, {"CountryRegion": {"name": "CountryRegion", "elements": ["COUNTRYCODE", "REGIONCODE"]}} . . . ].
Task: Your task is to analyze the asset I am currently browsing and its metadata, the assets I've recently viewed and their metadata, the assets of interest and their metadata, my role, and my personal preferences.
Chain-of-Thought Prompting: Based on the above information, let's think step by step. First, infer my intent of interest. Second, which assets are commonly used with the currently browsed asset? Finally, please select the top three assets of interest according to the intent of interest, rank them, provide a recommendation score, and recommend them to me.
Output format: Please present them in JSON format as: {"AssetName": {"Score": value, "Reason": "XXX"}}.

The prompt is provided to the generative AI 470 (e.g., an LLM). The generative AI 470 generates a recommended asset list, such as:
{
"SalesOrderItems": {"Score": 9, "Reason": "Detailed information about sales order items."},
"SalesQuota": {"Score": 8, "Reason": "Insights into sales targets and performance."},
"CountryRegion": {"Score": 7, "Reason": "Context on sales distribution across regions."}
}

Figure 6:
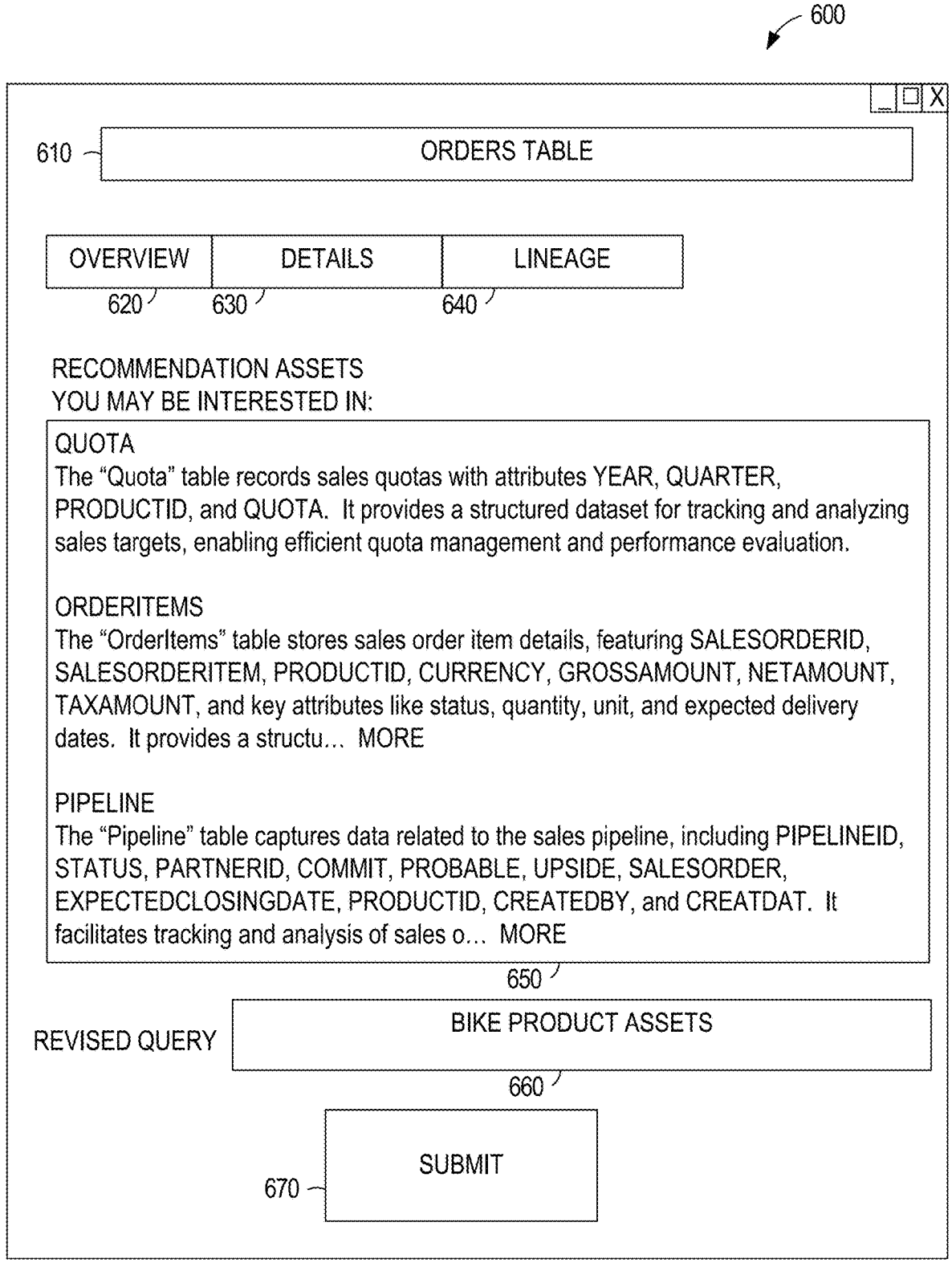
FIG. 6 shows an illustration of a user interface suitable for a data asset recommendation tool, according to some example embodiments.

FIG. 6 shows an illustration of a user interface 600 suitable for a data asset recommendation tool, according to some example embodiments. The user interface 600 includes a title 610, tabs 620, 630, and 640, an informational area 650, a query field 660, and a button 670. The user interface 600 may be presented after a user selects a recommended data asset using the user interface 500.

The title 610 indicates that the user interface 600 presents data for an Orders table. The tabs 620-640 are operable to display different information for the Orders table, such as an overview, details, or a lineage. In this case, the information about the Orders table has been replaced with the informational area 650, presenting recommended data assets.

The query field 660 receives a query from the user (e.g., if the user is dissatisfied with the recommendations). The query field 660 may be submitted for processing using the button 670. In response to detecting operation of the button 670, the asset recommendation service 140 may gather the query from the query field 660, use it to generate a prompt, provide the generated prompt to a generative AI, and receive recommendations as output from the generative AI.

With reference to the data flow 400 of FIG. 4, the revised query corresponds to the additional prompt 495. Accordingly, an updated version of the user interface 600 may be presented with updated recommendations and the process repeated until the user accepts the recommendation.

Figure 7:
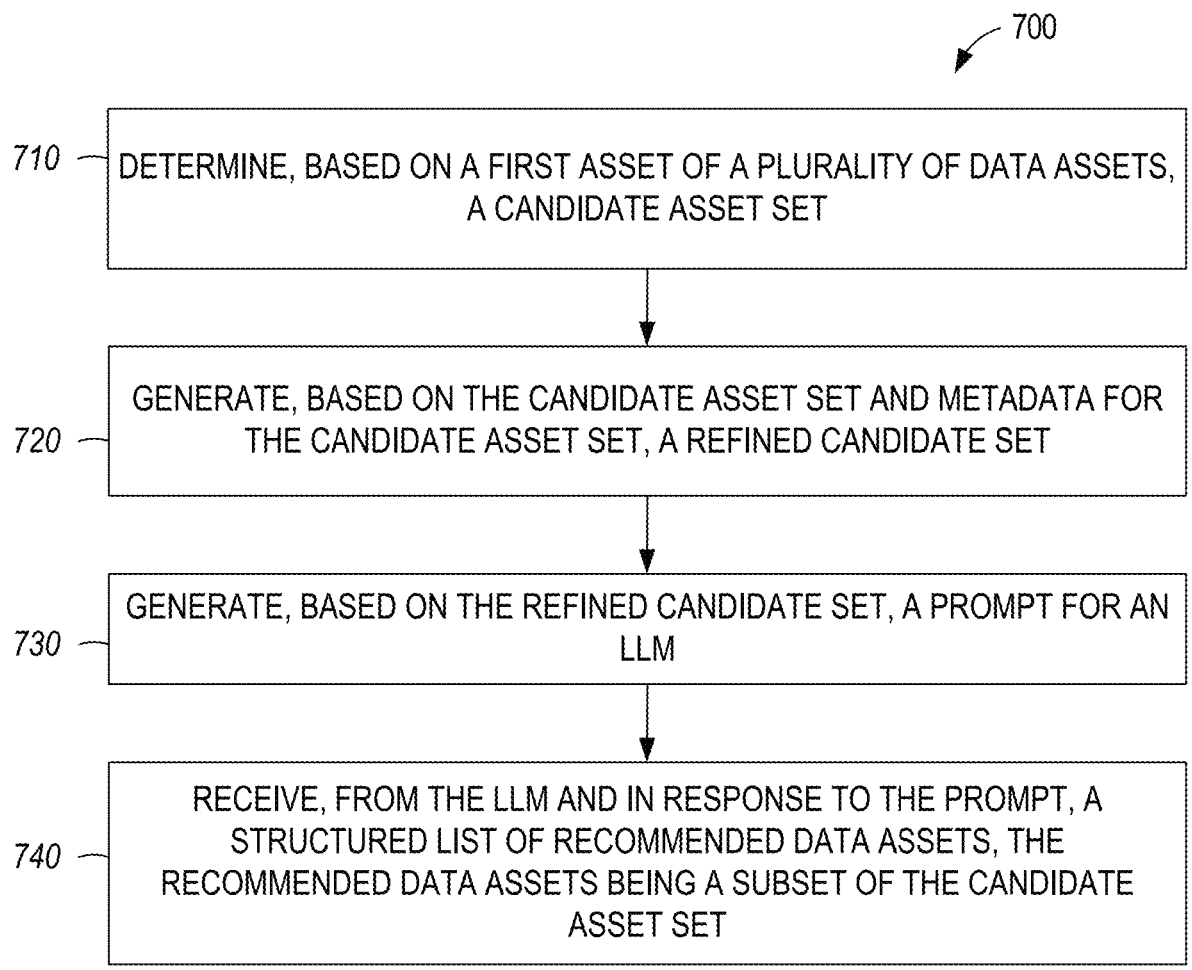
FIG. 7 illustrates a flowchart for a method of providing an LLM-based recommender system for data catalogs, according to some example embodiments.

FIG. 7 The method 700 includes operations 710, 720, 730, and 740. By way of example and not limitation, the method 700 is described as being performed by the asset recommendation service 140 of FIG. 1, using the modules of FIG. 2, and the machine learning model of FIG. 3.

In operation 710, the recall module 220 determines, based on a first asset of a plurality of data assets, a candidate asset set. For example, the first asset may be a data asset currently or most recently viewed by a user. The plurality of data assets may be assets from the database server 150, described by the asset metadata 155. The candidate asset set may be the entirety of the plurality of data assets or a subset thereof. For example, each asset set may be assigned a vector and the K nearest neighbors of the first asset may be determined and used as the candidate asset set. The vectors may be determined based on a description of each asset. For example, a library may be used that assigns a different vector to each word. The word vectors for a description may be summed to create a description vector for each asset.

The candidate asset set may be determined using a collaborative filtering algorithm. For example, user-based collaborative filtering, item-based collaborative filtering, model-based collaborative filtering, or any suitable combination thereof may be used. User-based collaborative filtering selects candidate assets for the user based on information about the user and other users that have similarities to the user (e.g., have the same role as the user). Item-based collaborative filtering selects candidate assets that are similar to assets already considered by the user. Model-based collaborative filtering uses a statistical or machine learning model to identify patterns in data. The model is used to estimate the user's interest in the available assets based on data for the user.

The metadata module 230 generates, in operation 720, a refined candidate set based on the candidate asset set and metadata for the candidate asset set. For example, the candidate asset set may comprise names of the assets in the candidate asset set and the refined candidate set may include names and metadata for the assets.

Based on the refined candidate set, the prompt constructor module 240 generates a prompt for an LLM (operation 730) of the generative AI module 250. For example, the prompt may include the names and metadata for the assets in the refined candidate set, as well as a request for the LLM to select one or more recommended assets from the refined candidate set.

Additionally or alternatively, the prompt may be based on data for the user. For example, the prompt may include (or be otherwise based on) a user role, a user interest, a user query, or any suitable combination thereof. In some example embodiments, the prompt includes chain-of-thought instructions.

In operation 740, the generative AI module 250 receives, from the LLM and in response to the prompt, a structured list of recommended data assets, the recommended data assets being a subset of the candidate asset set. Thus, by use of the method 700, an LLM is used to generate asset recommendations without hallucinating assets that do not exist.

Figure 8:
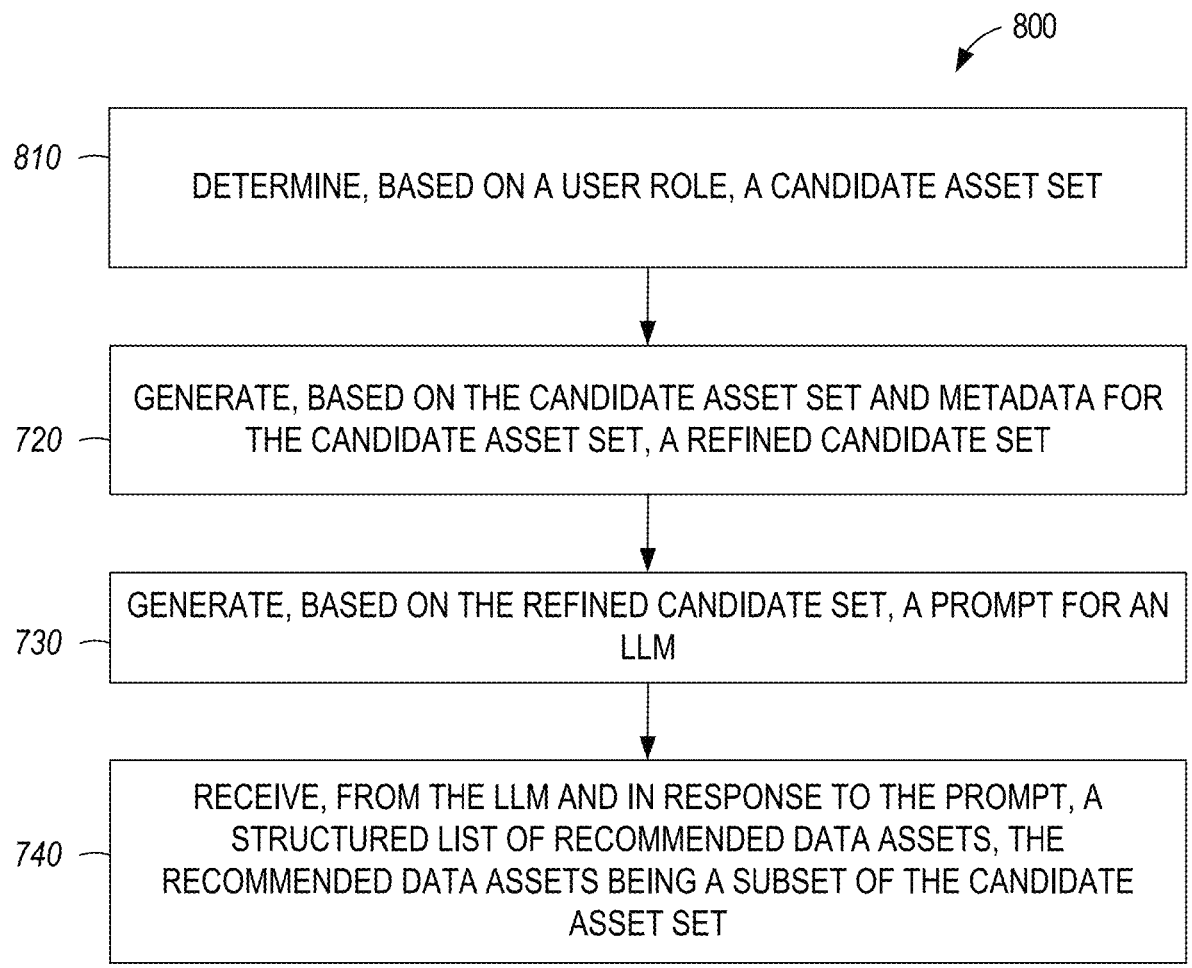
FIG. 8 illustrates a flowchart for a method of providing an LLM-based recommender system for data catalogs, according to some example embodiments.

FIG. 8 illustrates a flowchart for a method 800 of providing an LLM-based recommender system for data catalogs, according to some example embodiments. The method 800 includes operations 810, 720, 730, and 740. By way of example and not limitation, the method 800 is described as being performed by the asset recommendation service 140 of FIG. 1, using the modules of FIG. 2, and the machine learning model of FIG. 3. The method 800 is an alternative to the method 700 of FIG. 7, for use in the "cold-start" scenario in which little or no history information is available for the user requesting the asset recommendations. Operations 720-740 are described above, with respect to FIG. 7.

In operation 810, the recall module 220 determines, based on a user role, a candidate asset set. For example, the user may have the role of "sales manager." Instead of using an asset currently being viewed by the user or a list of assets previously viewed by the user, data for other users with the same role may be used. For example, the candidate asset set may be formed by identifying the top ten assets most frequently viewed by other users with the same role. The determining of the candidate asset set in operation 810 may also be based on a user area of interest. For example, the user may have filled out a profile form and indicated "sales" as an area of interest. Accordingly, assets containing the word "sales" in their descriptions may be included in the candidate asset set. Alternatively, a word vector may be generated based on the area of interest and based on descriptions of the candidate sets. A similarity measure (e.g., cosine distance) may be determined for the area of interest vector and the description vectors to determine a score for each asset. The candidate asset set may be formed of a predetermined number of highest scoring assets, all assets with at least a predetermined score, or any suitable combination thereof.

Figure 9:
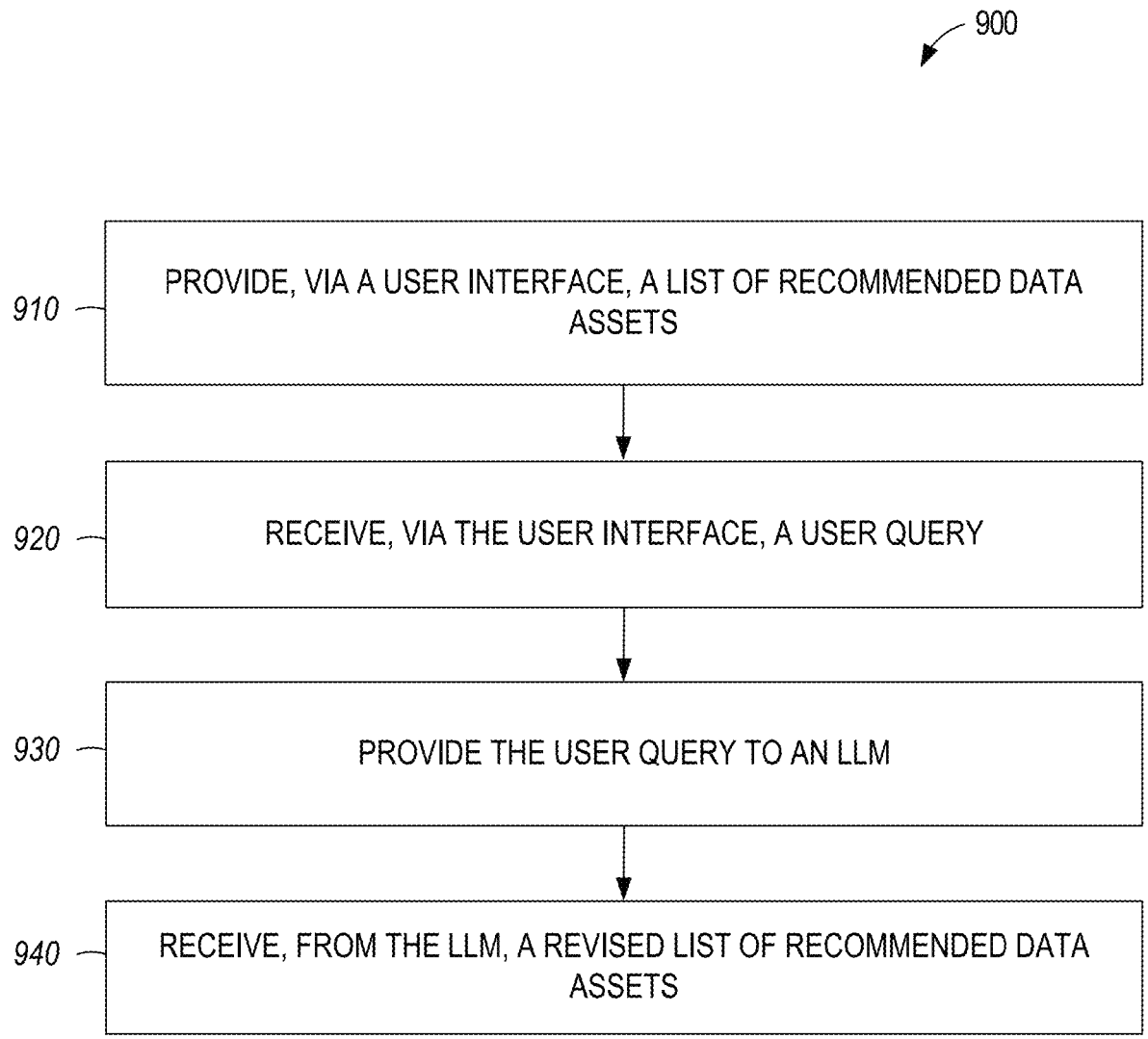
FIG. 9 illustrates a flowchart for a method of providing an LLM-based recommender system for data catalogs, according to some example embodiments.

FIG. 9 illustrates a flowchart for a method 900 of providing an LLM-based recommender system for data catalogs, according to some example embodiments. The method 900 includes operations 910, 920, 930, and 940. By way of example and not limitation, the method 900 is described as being performed by the asset recommendation service 140 of FIG. 1, using the modules of FIG. 2, and the machine learning model of FIG. 3. The method 900 may be used after the method 700 of FIG. 7, to present results and further refine them.

In operation 910, the asset recommendation service 140 provides, via a user interface, a list of recommended data assets. For example, the user interface 500 of FIG. 5 may be used to present a list of recommended data assets as the results 580A-580D. The list of recommended data assets may have been received from the generative AI module 250 in operation 730 of the method 700.

The asset recommendation service 140 receives, via the user interface, a user query (operation 920). For example, the query field 660 of FIG. 6 may be used to receive the user query.

In operation 930, the generative AI module 250 provides the user query to an LLM. A revised list of recommended data assets is received from the LLM in operation 940. The revised list of recommended data assets may be presented in an updated version of the user interface 600, replacing the list presented in operation 910 with the revised list received in operation 930. The method 900 may be repeated until terminated by the user (e.g., by accepting one or more of the recommended data assets).

In view of the above-described implementations of subject matter this application discloses the following list of examples. One feature of an example in isolation or more than one feature of an example, taken in combination and, optionally, in combination with one or more features of one or more further examples are further examples also falling within the disclosure of this application.

Example 1 is a system for recommending data assets, the system comprising: a memory that stores instructions; and one or more processors coupled to the memory and configured to execute the instructions to perform operations comprising: determining, based on a first asset of a plurality of data assets, a candidate asset set; generating, based on the candidate asset set and metadata for the candidate asset set, a refined candidate set; generating, based on the refined candidate set, a prompt for a large language model (LLM); and receiving, from the LLM and in response to the prompt, a structured list of recommended data assets, the recommended data assets being a subset of the candidate asset set.

In Example 2, the subject matter of Example 1, wherein the determining of the candidate asset set comprises using a collaborative filtering algorithm.

In Example 3, the subject matter of Examples 1-2, wherein the generating of the LLM prompt is further based on a user role.

In Example 4, the subject matter of Example 3, wherein the generating of the LLM prompt is further based on a user interest.

In Example 5, the subject matter of Examples 1-4, wherein the generating of the LLM prompt is further based on a user query.

In Example 6, the subject matter of Examples 1-5, wherein the LLM prompt further comprises chain-of-thought instructions.

In Example 7, the subject matter of Examples 1-6, wherein the operations further comprise: receiving, via a user interface, a user query; providing the user query to the LLM; and receiving, from the LLM and in response to the user query, a revised structured list of recommended data assets.

In Example 8, the subject matter of Examples 1-7, wherein the operations further comprise: determining, based on a user role and a user area of interest, a second candidate asset set; generating, based on the second candidate asset set and metadata for the second candidate asset set, a second refined candidate set; generating, based on the second refined candidate set, a second prompt for the LLM; and receiving, from the LLM, a second structured list of second recommended data assets, the second recommended data assets being a subset of the second candidate asset set.

Example 9 is a non-transitory computer-readable medium that stores instructions that, when executed by one or more processors, cause the one or more processors to perform operations comprising: determining, based on a first asset of a plurality of data assets, a candidate asset set; generating, based on the candidate asset set and metadata for the candidate asset set, a refined candidate set; generating, based on the refined candidate set, a prompt for a large language model (LLM); and receiving, from the LLM and in response to the prompt, a structured list of recommended data assets, the recommended data assets being a subset of the candidate asset set.

In Example 10, the subject matter of Example 9, wherein the determining of the candidate asset set comprises using a collaborative filtering algorithm.

In Example 11, the subject matter of Examples 9-10, wherein the generating of the LLM prompt is further based on a user role.

In Example 12, the subject matter of Example 11, wherein the generating of the LLM prompt is further based on a user interest.

In Example 13, the subject matter of Examples 9-12, wherein the generating of the LLM prompt is further based on a user query.

In Example 14, the subject matter of Examples 9-13, wherein the LLM prompt further comprises chain-of-thought instructions.

In Example 15, the subject matter of Examples 9-14, wherein the operations further comprise: receiving, via a user interface, a user query; providing the user query to the LLM; and receiving, from the LLM and in response to the user query, a revised structured list of recommended data assets.

In Example 16, the subject matter of Examples 9-15, wherein the operations further comprise: determining, based on a user role and a user area of interest, a second candidate asset set; generating, based on the second candidate asset set and metadata for the second candidate asset set, a second refined candidate set; generating, based on the second refined candidate set, a second prompt for the LLM; and receiving, from the LLM, a second structured list of second recommended data assets, the second recommended data assets being a subset of the second candidate asset set.

Example 17 is a method comprising: determining, by one or more processors and based on a first asset of a plurality of data assets, a candidate asset set; generating, based on the candidate asset set and metadata for the candidate asset set, a refined candidate set; generating, based on the refined candidate set, a prompt for a large language model (LLM); and receiving, from the LLM and in response to the prompt, a structured list of recommended data assets, the recommended data assets being a subset of the candidate asset set.

In Example 18, the subject matter of Example 17, wherein the determining of the candidate asset set comprises using a collaborative filtering algorithm.

In Example 19, the subject matter of Examples 17-18, wherein the generating of the LLM prompt is further based on a user role.

In Example 20, the subject matter of Example 19, wherein the generating of the LLM prompt is further based on a user interest.

Example 21 is an apparatus comprising means to implement any of Examples 1-20.

Figure 10:
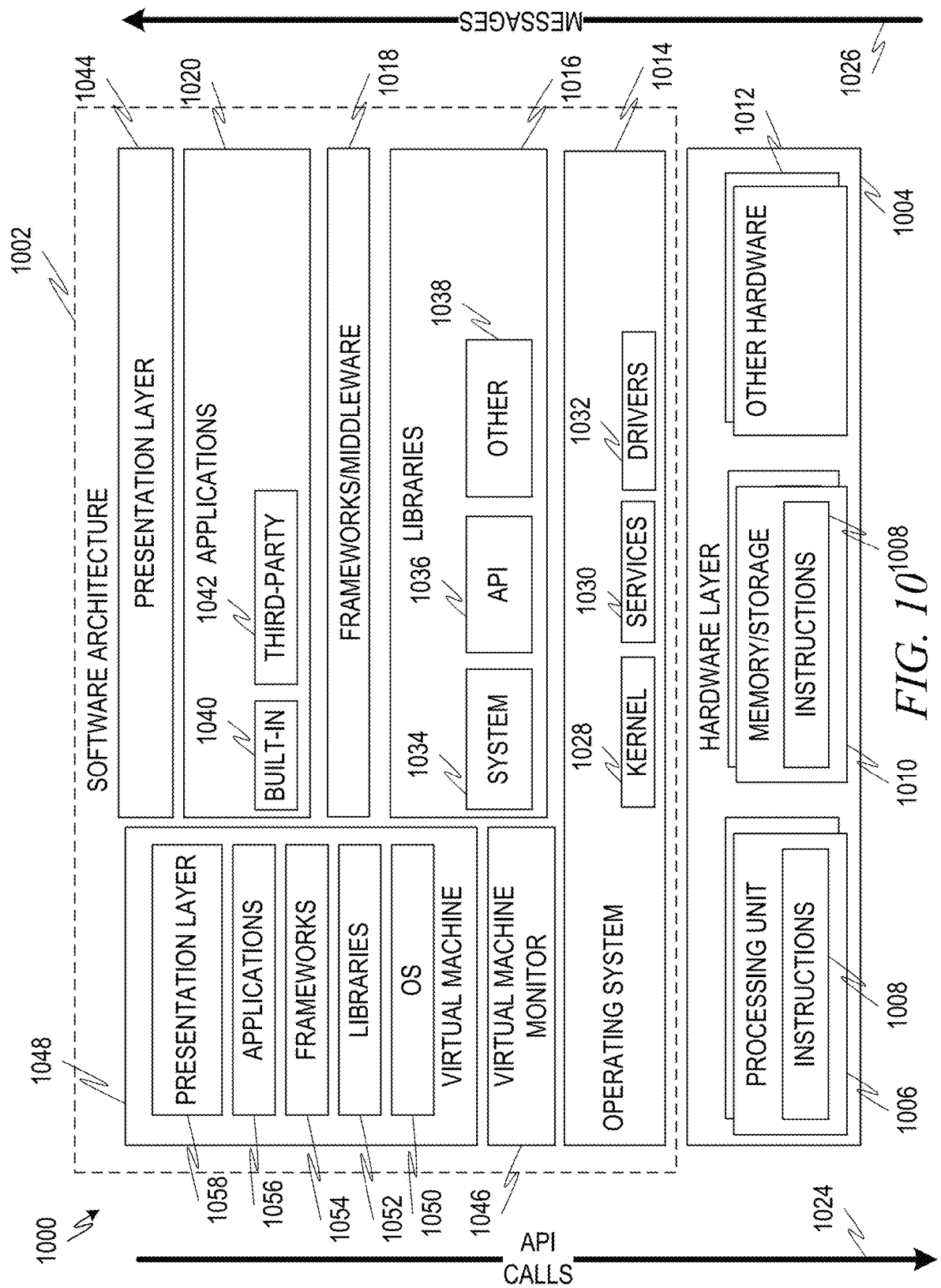
FIG. 10 shows a block diagram showing one example of a software architecture for a computing device.

FIG. 10 shows a block diagram 1000 showing one example of a software architecture 1002 for a computing device. The software architecture 1002 may be used in conjunction with various hardware architectures, for example, as described herein. FIG. 10 is merely a non-limiting example of a software architecture, and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system of FIG. 10.

The representative hardware layer 1004 comprises one or more processing units 1006 having associated executable instructions 1008. Executable instructions 1008 represent the executable instructions of the software architecture 1002, including implementation of the methods, modules, subsystems, and components, and so forth described herein and may also include memory and/or storage modules 1010, which also have executable instructions 1008. Hardware layer 1004 may also comprise other hardware 1012 which represents any other hardware of the hardware layer 1004. Examples of the other hardware 1012 include the hardware components shown in FIG. 11.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and presentation layer 1044. Operationally, the applications 1020 and/or other components within the layers may invoke application programming interface (API) calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the software architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks/middleware 1018 may provide a higher-level common infrastructure that may be utilized by the applications 1020 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. Third-party applications 1042 may include any of the built-in applications as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1042 may invoke the API calls 1024 provided by the mobile operating system such as operating system 1014 to facilitate functionality described herein.

The applications 1020 may utilize built-in operating system functions (e.g., kernel 1028, services 1030 and/or drivers 1032), libraries (e.g., system libraries 1034, API libraries 1036, and other libraries 1038), and frameworks/middleware 1018 to create user interfaces to interact with users of the system. Alternatively, or additionally, in some systems, interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine is hosted by a host operating system (operating system 1014) and typically, although not always, has a virtual machine monitor 1046, which manages the operation of the virtual machine 1048 as well as the interface with the host operating system (i.e., operating system 1014). A software architecture executes within the virtual machine 1048 such as an operating system 1050, libraries 1052, frameworks/middleware 1054, applications 1056 and/or presentation layer 1058. These layers of software architecture executing within the virtual machine 1048 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array [FPGA] or an application-specific integrated circuit [ASIC]) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 11:
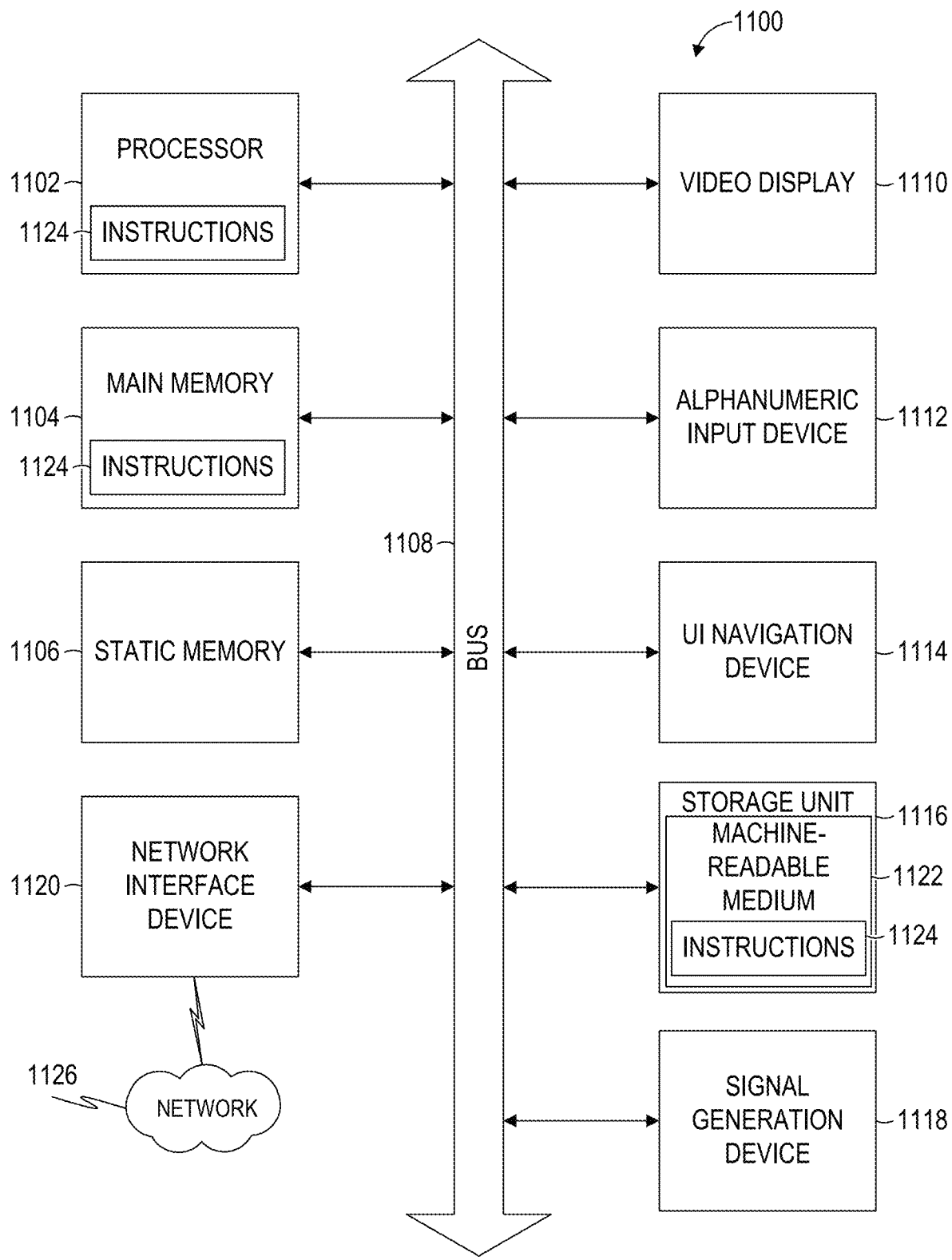
FIG. 11 shows a block diagram of a machine in the example form of a computer system within which instructions may be executed for causing the machine to perform any one or more of the methodologies discussed herein.

FIG. 11 shows a block diagram of a machine in the example form of a computer system 1100 within which instructions 1124 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit [CPU], a graphics processing unit [GPU], or both), a main memory 1104, and a static memory 1106, which communicate with each other via a bus 1108. The computer system 1100 may further include a video display unit 1110 (e.g., a liquid crystal display [LCD] or a cathode ray tube [CRT]). The computer system 1100 also includes an alphanumeric input device 1112 (e.g., a keyboard or a touch-sensitive display screen), a user interface (UI) navigation (or cursor control) device 1114 (e.g., a mouse), a storage unit 1116, a signal generation device 1118 (e.g., a speaker), and a network interface device 1120.

Machine-Readable Medium

The storage unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting a machine-readable medium 1122.

While the machine-readable medium 1122 is shown in FIG. 11 to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with the instructions 1124. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1124 may further be transmitted or received over a communications network 1126 using a transmission medium. The instructions 1124 may be transmitted using the network interface device 1120 and any one of a number of well-known transfer protocols (e.g., hypertext transport protocol [HTTP]). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system for recommending data assets, the system comprising:
    a memory that stores instructions; and
    one or more processors coupled to the memory and configured to execute the instructions to perform operations comprising:
        determining, based on a first asset of a plurality of data assets, a candidate asset set;
        generating, based on the candidate asset set and metadata for the candidate asset set, a refined candidate set;
        generating, based on the refined candidate set, a prompt for a large language model (LLM); and
        receiving, from the LLM and in response to the prompt, a structured list of recommended data assets, the recommended data assets being a subset of the candidate asset set.

2. The system of claim 1, wherein the determining of the candidate asset set comprises using a collaborative filtering algorithm.

3. The system of claim 1, wherein the generating of the LLM prompt is further based on a user role.

4. The system of claim 3, wherein the generating of the LLM prompt is further based on a user interest.

5. The system of claim 1, wherein the generating of the LLM prompt is further based on a user query.

6. The system of claim 1, wherein the LLM prompt further comprises chain-of-thought instructions.

7. The system of claim 1, wherein the operations further comprise:
    receiving, via a user interface, a user query;
    providing the user query to the LLM; and
    receiving, from the LLM and in response to the user query, a revised structured list of recommended data assets.

8. The system of claim 1, wherein the operations further comprise:
    determining, based on a user role and a user area of interest, a second candidate asset set;
    generating, based on the second candidate asset set and metadata for the second candidate asset set, a second refined candidate set;

generating, based on the second refined candidate set, a second prompt for the LLM; and receiving, from the LLM, a second structured list of second recommended data assets, the second recommended data assets being a subset of the second candidate asset set.

9. A non-transitory computer-readable medium that stores instructions that, when executed by one or more processors, cause the one or more processors to perform operations comprising:

determining, based on a first asset of a plurality of data assets, a candidate asset set;

generating, based on the candidate asset set and metadata for the candidate asset set, a refined candidate set;

generating, based on the refined candidate set, a prompt for a large language model (LLM); and receiving, from the LLM and in response to the prompt, a structured list of recommended data assets, the recommended data assets being a subset of the candidate asset set.

10. The non-transitory computer-readable medium of claim 9, wherein the determining of the candidate asset set comprises using a collaborative filtering algorithm.

11. The non-transitory computer-readable medium of claim 9, wherein the generating of the LLM prompt is further based on a user role.

12. The non-transitory computer-readable medium of claim 11, wherein the generating of the LLM prompt is further based on a user interest.

13. The non-transitory computer-readable medium of claim 9, wherein the generating of the LLM prompt is further based on a user query.

14. The non-transitory computer-readable medium of claim 9, wherein the LLM prompt further comprises chain-of-thought instructions.

15. The non-transitory computer-readable medium of claim 9, wherein the operations further comprise:
receiving, via a user interface, a user query;
providing the user query to the LLM; and
receiving, from the LLM and in response to the user query, a revised structured list of recommended data assets.

16. The non-transitory computer-readable medium of claim 9, wherein the operations further comprise:
determining, based on a user role and a user area of interest, a second candidate asset set;
generating, based on the second candidate asset set and metadata for the second candidate asset set, a second refined candidate set;
generating, based on the second refined candidate set, a second prompt for the LLM; and
receiving, from the LLM, a second structured list of second recommended data assets, the second recommended data assets being a subset of the second candidate asset set.

17. A method comprising:
determining, by one or more processors and based on a first asset of a plurality of data assets, a candidate asset set;
generating, based on the candidate asset set and metadata for the candidate asset set, a refined candidate set;
generating, based on the refined candidate set, a prompt for a large language model (LLM); and
receiving, from the LLM and in response to the prompt, a structured list of recommended data assets, the recommended data assets being a subset of the candidate asset set.

18. The method of claim 17, wherein the determining of the candidate asset set comprises using a collaborative filtering algorithm.

19. The method of claim 17, wherein the generating of the LLM prompt is further based on a user role.

20. The method of claim 19, wherein the generating of the LLM prompt is further based on a user interest.

* * * * *